Figure 1:
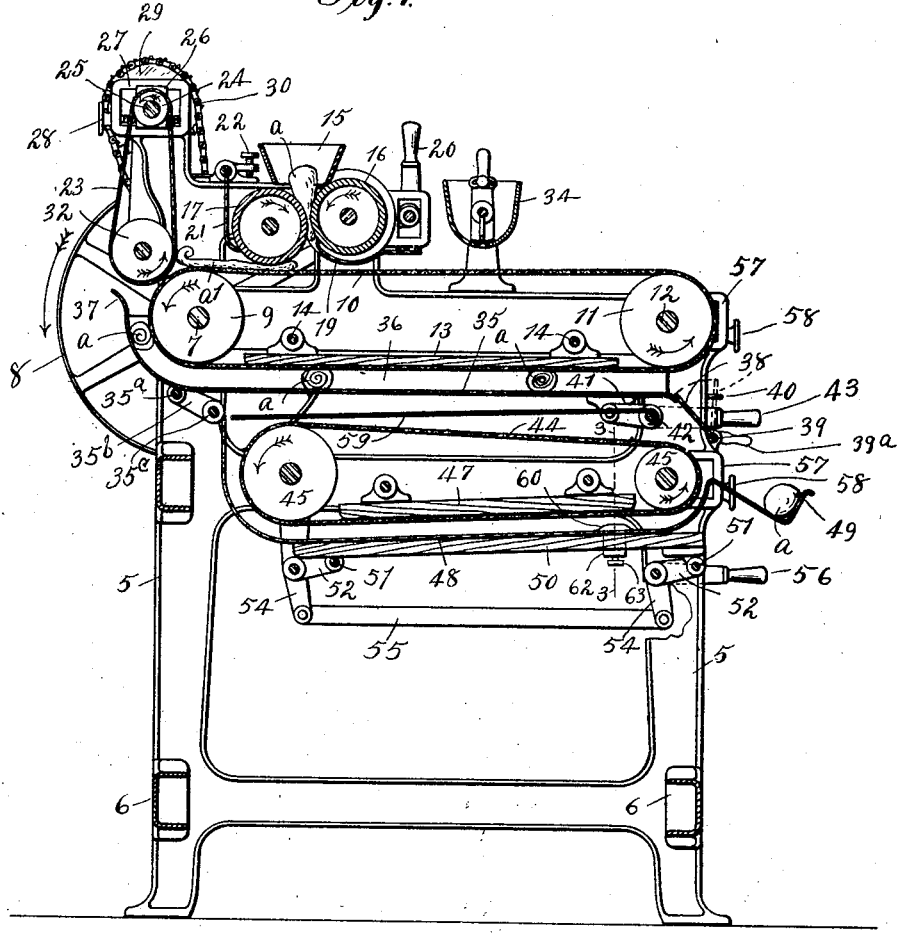

P. F. CARROLL.
LONG LOAF MOLDING MACHINE.
APPLICATION FILED DEC. 1, 1910.

1,037,820.

Patented Sept. 3, 1912.
2 SHEETS—SHEET 1.

P. F. CARROLL.
LONG LOAF MOLDING MACHINE.
APPLICATION FILED DEC. 1, 1910.
1,037,820.
Patented Sept. 3, 1912.
2 SHEETS—SHEET 2.
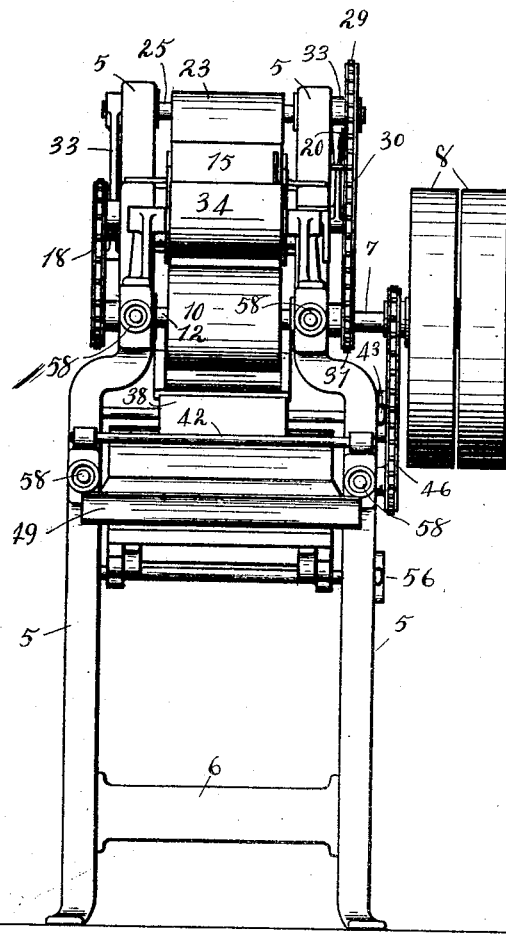
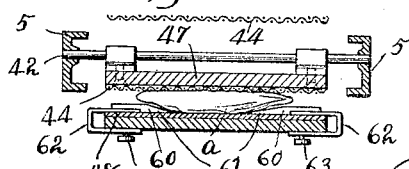

UNITED STATES PATENT OFFICE.

PHILIP F. CARROLL, OF JOLIET, ILLINOIS.

LONG-LOAF-MOLDING MACHINE.

1,037,820.  Specification of Letters Patent.  Patented Sept. 3, 1912.

Application filed December 1, 1910. Serial No. 595,040.

*To all whom it may concern:*

Be it known that I, PHILIP F. CARROLL, a citizen of the United States, residing at Joliet, in the county of Will and State of Illinois, have invented certain new and useful Improvements in Long-Loaf-Molding Machines, of which the following is a specification.

My invention relates to the art of bread making and refers particularly to machines employed for shaping or molding the dough after having been divided into portions of uniform size and weight.

The chief objects of the improvements which constitute the subject matter of this application for patent are to provide means in a dough molding machine for adjusting the mechanism so as to accommodate the channels through which the divided portions pass to the size of said portions of dough as fed to the machine; to furnish means whereby the duration of the molding process may be quickly shortened or lengthened as may be desired, the result being reached by varying the length of the passage through which the dough is conducted.

Another object is to provide means for varying the application of the pressure devices so as to produce loaves differing in shape.

I accomplish the above results by employing the apparatus illustrated in the accompanying drawings, which form a part of this application, the details of construction being disclosed in the following views:—

Figure 1 is a longitudinal sectional view of the complete machine; Fig. 2 is an end elevation, and Fig. 3 is a sectional view on the line 3—3 of Fig. 1.

Referring to the details of the drawings, the numeral 5 indicates side members, connected by cross-pieces 6 to form a rectangular frame. Journaled in these side members near the rear end of the machine is a main or drive shaft 7, upon one projecting end of which are mounted fast and loose pulleys 8. This shaft 7 carries a drum or roller 9 engaged by an endless canvas apron or belt 10, which extends to the front of the machine where it passes around an idle roller 11 mounted on a shaft 12. The lower course of the apron 10 is backed by a board 13 supported on transverse rods 14 secured in the frame sides. Above said apron is arranged a feed hopper 15, and immediately beneath this hopper are a pair of feed rollers 16, 17, slightly spaced apart to allow the passage of the dough portions one of which is shown at $a$, at the same time exerting a sufficient pressure to convert it into a flattened sheet, as indicated at $a^1$. The rolls 16, 17, are given the proper motion toward each other, indicated by the arrows, by means of a chain gear 18, which engages suitable sprockets mounted upon the respective shafts. In order to rotate the feed rollers in opposite directions, by a single chain, the latter passes over the sprocket of one roller and under the other, an expedient frequently made use of in sprocket gearing, and therefore not shown. The feed roller 16 is furnished with a scraper 19 which is capable of adjustment by means of a lever 20. The purpose of this scraper is to prevent the dough from adhering to the roller surface and also aid in directing the dough mass rearwardly so that it will pass between the roller 17 and the upper course of said apron 10, the interval between these members being so regulated as to still further flatten the dough. The roller 17 is also furnished with a scraper 21, which is adjustable by a thumb screw 22. Running in close proximity to the endless band 10 to the rear of the feed rollers is an endless apron 23 the courses of which are nearly vertical. This apron at its upper end passes around a roller 24, having its shaft 25, journaled at each end in a block 26, slidably mounted in guides 27 and adjustable by a hand screw 28. One end of said shaft 25 is provided with a sprocket 29, connected by a chain 30 with a sprocket 31 on the drive shaft 7. The lower end of the said apron 23 is supported by a roller 32, which is journaled at the ends in hanger bars 33 (Fig. 2) having their upper ends pivoted on the shaft 25, this arrangement permitting the roller 32 and apron 23 to swing away from the apron 10, to permit the passage of the dough portions when properly formed in the manner hereinafter described.

Extending transversely above the apron 10 is a flour dredge 34 supported from the frame by suitable brackets. Running parallel with and below the lower course of the apron 10 is a guide plate 35, the interval between the said apron and plate forming a channel 36 for the passage of the loaves of dough. The upper end of this guide plate curves upwardly and is bent outwardly, as indicated at 37 to form a mouth adapted to guide the dough portions into the said channel 36. The forward end of the guide plate 35 terminates directly beneath the roller 11, and the interval between said plate and the end of the frame forms a passageway which is controlled by a valve 38 pivoted on a transverse rod 39, and adapted to be moved by a handle 39ª, secured to said rod to the position shown in dotted lines in Fig. 1, where it rests against a stop 40. The said plate 35 is supported at the forward end on a pair of rock-arms 41 mounted on a rock-shaft 42 extending between the side frame members 5, a lever 43 attached to said shaft 42 permitting of ready adjustment of this end of the said plate so as to vary the depth of the channel 36. The rear end of the said plate 35 is suported upon a transverse rod 35ª attached by arms 35ᵇ to a rock-shaft 35ᶜ, so that this end of the plate is adjustable by turning the said shaft, which is done by hand. At a suitable distance below the apron 10 is another endless apron 44 extending nearly horizontally, and supported at the front and rear ends by rollers 45. This belt or apron 44 is driven from the main shaft 7 by a chain 46, and the lower course of the apron is backed up by a board 47, in the same manner as the apron 10 is supported from upward pressure by the board 13, previously described.

Extending parallel with the lower course of the apron 44 is a plate 48, having its rear end bent upwardly concentric with the corresponding roller 45, its forward end also having an upward curve toward the roller after which it is bent downward at an angle and terminates in a ledge or flange 49 forming a receiving trough into which the completed dough loaves fall, and from which they are transferred to the baking pans by hand. The said plate 48 is supported upon an adjustable table 50 which rests upon cross rods 51, fixed in the horizontal arms 52, of bell-crank levers keyed on rockshafts 53, the vertical arms 54 of said levers being connected by a link bar 55, so that the said shafts and consequently the arms 52, will move together when operated by a lever 56, attached to the forward rockshaft 53. Provision is made for adjusting the aprons 10 and 44 by journaling their forward shafts in blocks which slide in guide ways 57 in the frame and are secured by adjusting screws 58. Between the aprons 10 and 44 is arranged a lifting plate 59, having its forward end pivotally supported upon the rock shaft 42, while its rear end rests normally upon the endless band 44 directly over the rear roller 45, so that this end of the plate will be lifted by the dough portions as they are carried rearwardly by the upper course of the said band or apron 44, it being understood that the dough takes this course only when the valve 38 is raised.

Arranged upon the upper surface of the plate 48 are mounted a pair of wedge-shaped blocks 60, having their pointed ends 61 extending toward the median line. These blocks are held in position by straps or clips 62 which are bent around the margins of the said plate and the table 50 and are adjustably secured to the latter by screws 63 which pass through slots in said straps and permit the wedges 60 to be retracted or advanced so as to vary the distance between them to correspond with the size of the loaf to be molded. As these blocks lie in the path of the loaves of dough it will be readily seen that those portions which pass over the thicker parts of the wedges will receive greater pressure than the middle which is not engaged by the said wedges, and consequently the ends of the loaves will be more or less pointed, as shown in Fig. 3.

The operation of the machine described in a general way is as follows:—The divided portions of dough are placed singly in the hopper from which they pass immediately to the rollers 16, 17. Each dough mass is flattened by the action of the rollers and upon leaving the latter is forced between the rear roller 17 and the endless belt 10, producing an elongated ribbon of dough indicated at $a^1$. As the rear end of the ribbon reaches the belt 23 the upward movement of the latter will cause the end of the dough ribbon to curl over, as shown in Fig. 1, and the combined action of the belts 10 and 23 will quickly roll the dough into a cylinder, which will swing the roller 32 out of the way, and pass down into the channel 36 along which it will be carried with a continuous rotary movement until it reaches the end of the plate 35. If the valve 38 is in its inclined position, shown in full lines in Fig. 1, the formed loaf will ride thereover and fall directly into the receiving trough 49. When it is desired to prolong the kneading and molding process, the valve 38 is turned to its inoperative position shown in dotted lines, so that the loaves as they leave the channel 36 will fall directly upon the upper course of the apron 44 and will be carried rearwardly beneath the lifting plate 59, which is of sufficient weight to cause a continuation of the rotary motion of the dough with a varying amount of pressure as the loaf moves on, until it escapes beneath the free end of the said plate and is carried into the channel between the lower course of the belt or apron 44 and the plate 48 reaching at length the wedges 60 where the ends of the dough cylinders are given the required pointed shape, and finally receiving a finishing pressure between the upturned end of the said plate 48 and the roller 45 before dropping into the trough 49.

Having thus described my invention, what I claim as new, is:—

1. In a dough molding machine, including dough feeding, flattening and coiling means, the combination of molding means consisting of an endless conveyer, an adjustable pivoted pressure member spaced from said conveyer and adapted to form a receiving chute and a discharge trough at its respective ends.

2. In a dough molding machine, the combination with dough feeding means, an endless horizontal apron arranged to receive the dough from the feeding means, a plate arranged below said apron, means for adjusting said plate relatively to the said apron, and an endless belt arranged below said apron, of a lifting plate arranged between said plate and belt, said lifting plate being pivoted at one end and having the other end normally in contact with said belt, a forming plate arranged below said belt, a table supporting said forming plate, and means for adjusting said table.

3. In a dough molding machine, the combination with feeding means, an endless apron arranged to receive the dough from the feeding means, a pressure plate arranged below said apron, means for adjusting the plate relatively to the said apron, and an endless belt mounted parallel with and below said apron, of a valve arranged to change the course of travel of the loaves while being operated upon to vary the duration of the process, a lifting plate pivoted at one end between said pressure plate and the belt, and having the other end normally engaging the said belt, a forming plate arranged below said belt and coöperating therewith to act upon the loaves, an adjustable table supporting said forming plate, and means arranged within the path of the loaves and adapted to compress the ends of the said loaves.

4. In a dough molding machine, the combination with dough feeding means, an endless apron, arranged below the feeding means, an adjustable pressure plate arranged below said apron, and an endless belt mounted below and parallel with said plate, of a valve arranged to change the course of travel of the loaves after passing over said plate, a lifting plate pivoted at one end and having the other normally resting upon said belt, a forming plate arranged below said belt, an adjustable table supporting said forming plate, and means for pointing the loaves, said pointing means consisting of wedge-shaped members adjustably mounted on said forming plate.

In testimony whereof I affix my signature in the presence of two witnesses.

PHILIP F. CARROLL.

Witnesses:
 ERWIN T. GEIST,
 E. H. LENNON.